CARRYING FIXTURE FOR MINIATURE CIRCUIT COMPONENTS

Filed Aug. 14, 1963

Arnold M. Walkow,
Inventor.
Koenig, Pope, Denniger, and Powers,
Attorneys.

United States Patent Office 3,267,335
Patented August 16, 1966

3,267,335

CARRYING FIXTURE FOR MINIATURE CIRCUIT COMPONENTS

Arnold M. Walkow, Dallas, Tex., assignor to Texas Instruments Incorporated, Dallas, Tex., a corporation of Delaware Filed Aug. 14, 1963, Ser. No. 302,195
7 Claims. (Cl. 317—101)

Figures 1, 2, 3, 4:
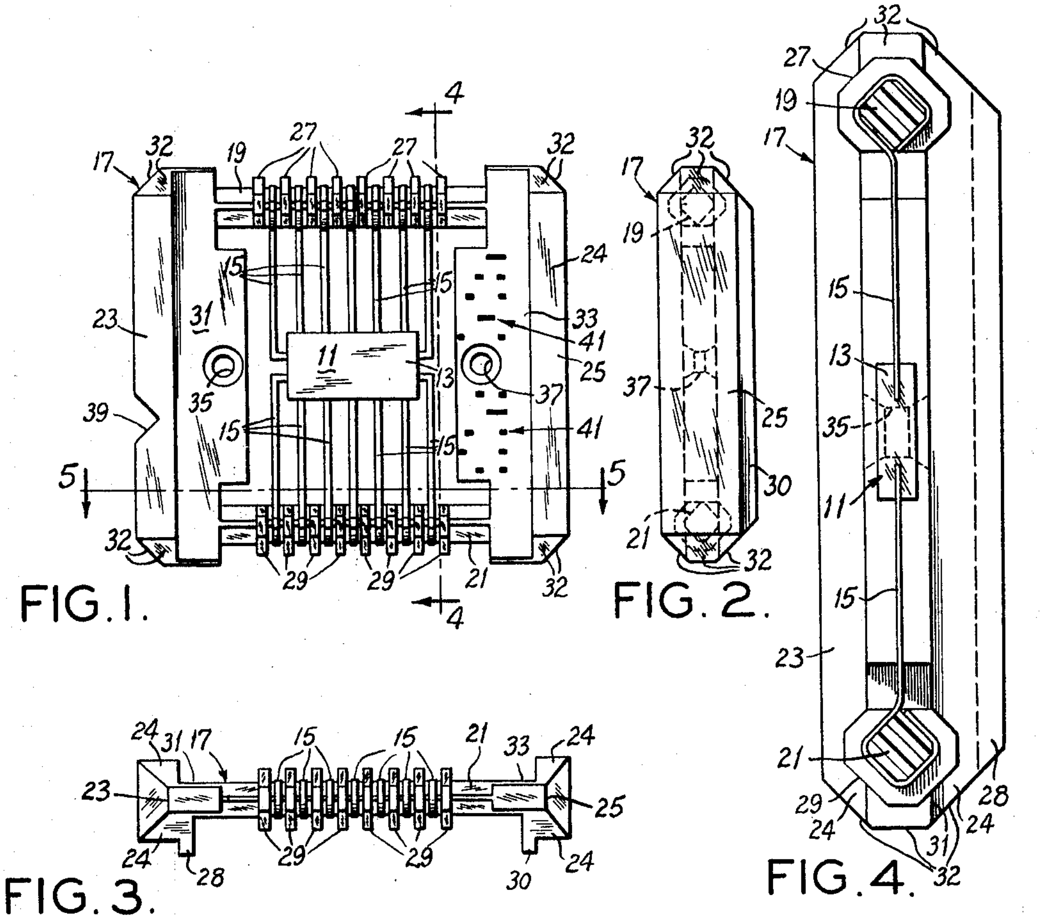

This invention relates to a carrier, and more particularly to a carrying fixture for electronic devices such as microminiature semiconductor networks and the like.

In the fabrication or assembly of electronic apparatus employing microminiature components such as integrated semiconductor networks or microcircuits, problems of packaging and handling arise which heretofore have prevented or greatly curtailed the use of automatic assembly techniques. Similar problems arise in breadboard circuits in which microminiature components are organized for design and testing purposes. Because of the extremely small dimensions of these components it is difficult to handle them for interconnections into a finished system, or to test their operating parameters and functioning in a test system. Moreover, because of their size, it is difficult to inscribe identifying symbolism or coding to readily identify each individual module as to type and electrical operating parameters. The present invention is directed to a novel carrying fixture or frame for integrated semiconductor networks or functional modules which obviates the above problems and permits efficient handling and indexing of these modules. While the invention is disclosed herein with respect to microcircuits, it will be understood that the novel carrier of the invention may advantageously be employed with other miniature electronic devices, for example transistors, or even conventional single parameter components such as resistors, capacitors, and the like.

Accordingly, among the several objects of this invention may be noted the provision of a carrying fixture or frame which facilitates handling and packaging of microminiature circuit components; the provision of such a fixture which also permits breadboarding of such components and testing of the operating parameters of the components; the provision of a carrying fixture for electronic devices which carries symbolism or coding indicative of the type of devices or the electrical characteristics and parameters thereof; the provision of a carrying fixture for miniature electronic devices which permits the use of automation techniques in assembling electrical apparatus employing these devices; the provision of a carrying fixture which includes guide means to insure proper orientation and indexing of the device in use or assembly; and the provision of a carrying fixture which is simple in construction and relatively inexpensive. Other objects and features will be in part apparent and in part pointed out hereinafter.

Essentially the invention is directed to a carrying fixture for an electronic device, the latter having a main body portion and a plurality of conductive leads secured thereto and extending therefrom. Typically, these leads are required to be electrically insulated one from another. This fixture comprises a frame having a pair of generally coplanar side members spaced apart a distance greater than a lateral dimension of the body portion of the device to be carried, whereby the device may be positioned between these members. Each of the side members includes an electrically insulating lead-receiving portion to which at least one of the conductive leads may be secured; for example, in the specific embodiment disclosed herein, these leads may be conveniently wrapped around the side members. The carrier further includes means integral with the side members for locating the leads received thereon, whereby the electronic device may be secured between said side members and held in a preselected spaced relation with respect thereto. The invention accordingly comprises the constructions hereinafter described, the scope of the invention being indicated in the following claims. In the accompanying drawings in which one of various possible embodiments of the invention is illustrated, FIGURE 1 is a plan view of a carrying fixture constructed in accordance with the invention and shown carrying a microminiature semiconductor network;

FIGURES 2 and 3 are end and side views of the fixture; and

Figure 5:
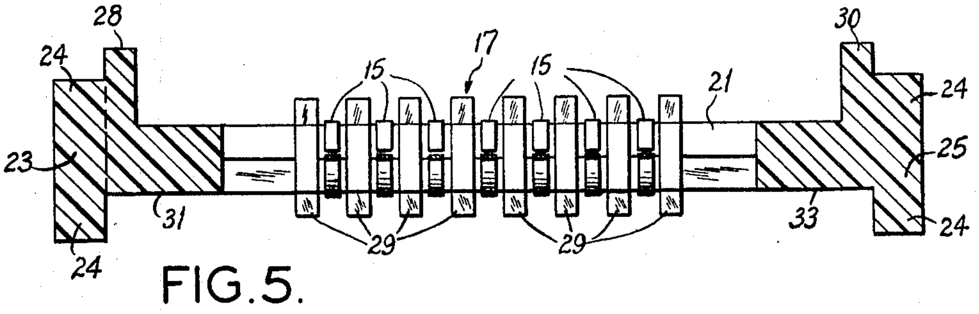

FIGURES 4 and 5 are cross-sectional views of the fixture taken along lines 4—4 and 5—5 respectively of FIGURE 1.

Corresponding reference characters indicate corresponding parts throughout the several views of the drawings.

Referring now to the drawings, a carrier constructed in accordance with this invention is illustrated as comprising a fixture for carrying a conventional semiconductor network (SCN) indicated at reference numeral 11. This SCN comprises a main body portion 13 to which is secured a plurality of conductive leads indicated at 15. The SCN 11 may be a microminiature flip-flop circuit, for example, or other logic component or similar circuit. In actual application of the SCN and to test the electrical operating characteristics or parameters of this component, it is essential that leads 15 be electrically insulated one from another.

The carrying fixture is indicated in its entirety by reference numeral 17 and comprises a preferably generally rectangular window frame formed by two side bars or members 19 and 21, which are held in generally coplanar parallel spaced relationship by a pair of end members or heads 23 and 25. In the specific fixture disclosed, the carrying frame is made of a molded electrically insulating plastic material, the side bars 19 and 21 being integral with end members 23 and 25. A plurality of flanges or partitions 27 divide the side bar 19 into a plurality of electrically insulating lead-receiving portions or recesses. Similarly a plurality of flanges 29 integral with the other side bar 21 serve to divide the latter into a plurality of lead-receiving recesses. Flanges 27 and 29 are oppositely disposed in pairs 27, 29. The side bars 19 and 21 each have a generally rectangular cross section, one pair of corners being preferably vertically disposed, and the other pair of corners being horizontally disposed, as viewed in FIGURE 4, for example. Each of the conductive leads extending from the body 13 of SCN 11 is secured in a respective lead-receiving recess by wrapping or forming the marginal portion or end of the lead around the side bars 19 and 21. This is shown most clearly in FIGURE 4.

Each of the end members or head bars 23 and 25 has a generally T-shaped cross section with cross portions 24 extending above and below flanges 27 and 29. This insures that when placed on a flat surface each of the leads 15 is physically spaced and electrically insulated from any surface on which the carrier may rest. A flange or extension rib 28 integral with and extending endwise of head 23 is provided, with a similar flange 30 being provided on member 25. These permit the nesting or stacking of a plurality of carriers thereby to facilitate packaging and handling of a group of carriers. Thus, as viewed in FIGURE 3, one carrier may be nested or telescoped with another by fitting flanges 28 and 30 between the guide portions 24 of the head members of an adjacent carrier. Moreover, because of the construction of the carrier disclosed herein, one carrier, after having been nested with another, may be removed or disengaged therefrom by sliding the one carrier laterally with respect to the other, i.e., parallel to the upwardly extending portions or flanges 24. This sliding type disengagement can be employed to advantage in automatic assembly equipment wherein a plurality of carriers can be loaded in stacks, and then fed out one at a time by moving either the top or bottom carrier of the stack laterally with respect to the stack. The end corner portions of members 23 and 25 are blunted in three planes by beveling as at 32, so that the outline of the carrier is generally free of sharp corners which might otherwise hang it in movements through guide passages in any automatic machinery through which it passes. Two flat surface members 31 and 33 are integral with and extend inwardly from members 23 and 25, and each has an opening 35 and 37, respectively, therethrough. When employed in cooperation with a suitable chassis or breadboard having two properly spaced posts or pins, these openings provide a means of temporarily securing the SCN to the chassis.

A notch 39 in end member 23 provides a guide means which insures proper indexing or orientation of the carrier (and hence the SCN) both in handling and packaging and in automatic assembly of apparatus employing the SCN. It will be understood that this notch merely represents one of any number of possible ways of indexing the carrying fixture.

To facilitate identification and classification of the SCN carried by the fixture, code marking is placed or inscribed on the carrier, for example, with a paint capable of being read either optically or magnetically. This code marking is shown at 41 as being applied on surface portion 33; however, it will be understood that any of the surfaces of the carrier could be used to carry an identifying symbolism, and in many cases more than one surface will be used, each carrying distinctive information regarding the device carried. As shown, the code is a binary type code having five significant places at ten different stations extending from the end of surface 33 adjacent bar 19 to the other end of this surface 33. In a specific embodiment of the carrier a so-called 1 2 4 7 code was employed to provide information concerning the type of electronic device and its operating parameters. In employing the carrier in automatic assembly apparatus, it will be understood that because the coding may be sensed magnetically, the apparatus can advantageously be provided with sensing means to sort or classify the devices fed into the apparatus. It will be appreciated that although the use of magnetic paint to provide the coded information is preferred, other means may be employed. For example, electrically conductive paint or inlays could be employed, or a reflective material could provide appropriate coded information.

In addition to providing a means of securing the SCN between the serrated bars 19 and 21, the generally rectangular or diamond shaped cross section of these bars provides a convenient means of applying test leads or probes to the various leads 15. For example, a test probe having a V-shaped end portion may be applied to any of the leads, in any orientation of the fixture, without the possibility of dislodging the SCN from its carrier. Also, two brushes from the test equipment may be used in contacting each lead in order to minimize the effects of contact resistance.

It will be understood that in some applications of the carrying fixture it will be used merely as a frame to facilitate handling prior to the assembly of the apparatus employing the SCN. In such a case, the SCN could be removed from the carrier just prior to its application to a printed circuit board; for example, by cutting the leads 15 with a suitable punch and die. Also, it will be understood that in low density applications, i.e., where size is unimportant, the carrier may be included as an integral part of the equipment along with the SCN. This would be particularly advantageous in cases where flexibility and an interchange of components may be required.

While the carrier disclosed herein has been specifically described as being made of a molded plastic material, it will be understood that any suitable dielectric or electrically insulating material, for example, a ceramic, may be employed. Moreover, portions of the carrier could be made of metal provided that the lead-receiving recesses serve to electrically insulate the various leads of the electronic device carried. And if the carrier serves merely as a frame to facilitate handling prior to the assembly of the apparatus employing the SCN, insulating the various leads of the SCN while in the carrier is not critical, and the entire carrier could be made of a conductive material. In such a case, however, testing and breadboarding of the SCN while carried in the fixture would not be possible, so it is preferred for universal use, that each side bar 19 and 21 include electrically insulating lead-receiving portions.

In summary, then, the present invention provides a carrying fixture particularly adapted to carry microminiature electronic components. Because this carrier provides easy handling of these components and prevents the leads thereof from being scattered randomly or bent, it facilitates the automatic assembly of apparatus employing such components. In addition to this, the carrier facilitates automatic classification of the component and testing thereof, is useful as a shipping container or storage block, and further serves as a breadboard tool to place the component temporarily in a circuit for engineering tryout.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Telescopically nestable and protective carrying fixtures for carrying electronic devices, each device having a main body portion and a plurality of conductive leads secured thereto and extending therefrom; each such fixture comprising a pair of spaced head bars connected by a pair of spaced side bars to form a substantially rectangular window frame, each of said head bars being shaped in cross section for guided sliding contact action on and sliding separation from the bars of an adjacent nested window frame, said side bars being formed with spaced recesses for the reception of said conductive leads, whereby body portions of said electronic devices may be carried in the window frames by the leads, said head bars being thicker transversely to the planes of their window frames than said side bars, main body portions and leads, whereby sliding separation between frames may be effected while protecting said devices against interference therebetween or with other objects.

2. A fixture according to claim 1, wherein each side bar is of a tilted substantially square cross section within its recesses to present to the sides and faces of the frames angular conformations of leads wrapped in the recesses, for the convenient application to the leads in the recesses of electrical test probes inserted from various directions relative to the frames.

3. A fixture according to claim 1, wherein each head bar is further shaped to include an inward flange within the window frame, each flange being of substantial area to contain at least one opening which is formed therethrough, said opening being for alignment with securing guide pins.

4. A fixture according to claim 1, wherein each side bar is of tilted square cross section within its recesses to present angular conformations of a lead wrapped therein for convenient applications of substantially V-shaped electrical test probes, and wherein each head bar is further shaped to include an inward flange within the window frame, each flange being of substantial area to contain at least one opening which is formed therethrough, said opening being for alignment with securing guide pins.

5. A fixture according to claim 3, wherein the area of at least one of said flanges is also sufficient for and carries printed coding information.

6. A fixture according to claim 5, including notch means on the outside of a head bar for indicating orientation.

7. Telescopically nestable carrying fixtures for carrying electronic devices, each device having a main body portion and a plurality of conductive leads secured thereto and extending therefrom; each such fixture comprising a pair of spaced insulating head bars connected by a pair of spaced insulating side bars to form a plane rectangular insulating window frame, each of said head bars being shaped in cross section for guided sliding action on and sliding separation from the bars of an adjacent nested window frame, each of said side bars being formed with spaced recesses, each recess for wrapping therein one of said conductive leads extending from a main body portion of an electronic device, whereby body portions of said electronic devices may be carried in the window frames by the leads, said head bars being thicker transversely to the planes of their window frames than said side bars, main body portions and leads to permit said separation while protecting said devices against interference therebetween and interference with other objects, each side bar having a polygonal cross section within its recesses to present an angular conformation of a lead wrapped therein for convenient application of electrical test probes, each head bar being shaped to include an inward flange within the window frame of substantial area for at least one opening therethrough, said opening being for alignment with a guide pin and each area being for the application of printed coding information to at least one of the areas, and notch means in at least one of said head bars for proper orientation.

References Cited by the Examiner

UNITED STATES PATENTS

| | | | |
|---|---|---|---|
| 2,446,179 | 8/1948 | Harnquist | 46—25 |
| 2,628,270 | 2/1953 | Himmel | 175—298 |
| 2,938,198 | 5/1960 | Berman | 340—347.3 |
| 3,078,335 | 2/1963 | Black | 174—138 |
| 3,134,049 | 5/1964 | Kilby | 317—101 |

ROBERT K. SCHAEFER, *Primary Examiner.*

KATHLEEN H. CLAFFY, *Examiner.*

H. J. RICHMAN, *Assistant Examiner.*